N. PAQUETTE.
MACHINE OILER.
APPLICATION FILED DEC. 11, 1917.

1,271,753.

Patented July 9, 1918.

Inventor
Napoleon Paquette
By Ithiel J. Cilley
Attorney

UNITED STATES PATENT OFFICE.

NAPOLEON PAQUETTE, OF GRAND RAPIDS, MICHIGAN.

MACHINE-OILER.

1,271,753. Specification of Letters Patent. Patented July 9, 1918.

Application filed December 11, 1917. Serial No. 206,705.

*To all whom it may concern:*

Be it known that I, NAPOLEON PAQUETTE, a citizen of the United States, residing at Grand Rapids, in the county of Kent and State of Michigan, have invented certain new and useful Improvements in Machine-Oilers, of which the following is a specification.

My invention relates to improvements in oilers for certain classes of machinery, and more especially for oiling certain bearings in automobiles, and its objects are: first, to provide a means whereby oil may be forced through a bolt upon the desired bearings without danger of clogging the oil opening to the bearing; second, to provide a means whereby a bolt oiler may be made to discharge oil upon the desired bearing at different points as the oil is being forced out of the bolt upon the bearing; third, to provide a means whereby the oil opening cleaner may be made to pass out of the oil opening and move longitudinally thereof without danger of being thrown from its normal position; fourth, to provide a means whereby the oil opening cleaner may be made to hold the cap of the cup at the outer end of the bolt from unscrewing when the automobile is moving over the road, and, fifth, to provide a means whereby the oil opening cleaner will move in a direct line in the opening without danger of marring the surface being oiled.

Figure 1:
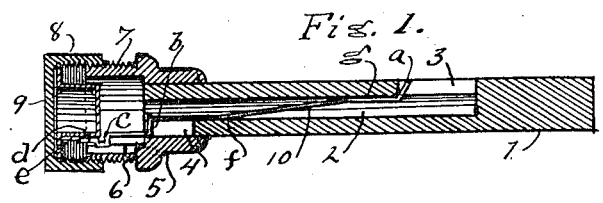
Figure 2:
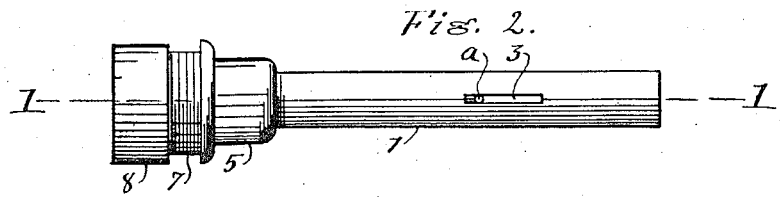
Figures 3, 4:
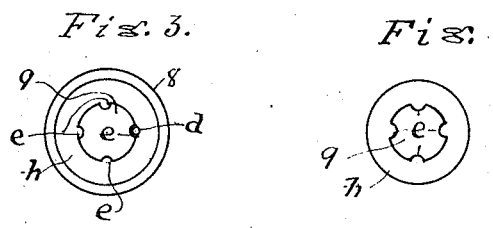
Figure 5:
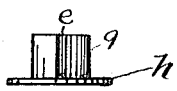

I attain these objects by the mechanism illustrated in the accompanying drawing, in which Figure 1 is a longitudinal section of the oiler bolt on the line 1—1 of Fig. 2. Fig. 2 is a plan of the bolt complete. Fig. 3 is a plan of the cap looking to the left from the bolt. Fig. 4 is a face view of the compressing head looking to the left from the bolt, and Fig. 5 is a side view of the same.

Similar reference characters refer to similar parts throughout the several views.

This oiler consists of a bolt 1 having a longitudinal opening 2 for the storage and conduction of heavy oil or grease. 3 represents the discharge opening where the oil is forced upon the bearing being lubricated or oiled, and is used in lieu of the ordinary small round hole in common use in this class of oilers. With the small openings last referred to it is a common incident for the opening to become so clogged that it is impossible to force oil through it, and to overcome this difficulty I have provided the slot 3, and have, also, provided a rod or cleaner 10 having an inclined end $a$ that is made to pass through the opening 3 and is made to travel in said opening as the cap 8 is screwed upon the head 7, and as grease is being forced out of the opening, so that it will be impossible for the opening to become clogged. The end or point $a$ is held securely in the slot by forming a bearing against the side of the bolt adjacent to the slot 4 in the end of the bolt. This slot is made of a width to allow the rod 10, at the offset $b$, to move freely therein, so that between the opening or slot 3 and the slot 4 the rod 10 is held firmly against being carried around in the opening 2 in the bolt. The outer end of the rod 10 has an offset $b$ to travel in the slot 4, and another offset $c$ arranged to slide freely in a slot 6 in the wall of the head 5, the bearing at $b$, $f$ and $g$ being of such a nature as to cause the end $d$ of the rod 10 to stand, normally, in close contact with the wall of the compression extension 9 in the depressions $e$, so that when the cap 8 has been screwed into a given position on the head 5—6 it cannot be made to be screwed onto, or unscrewed from the head without sufficient force being exercised to force the end $d$ of the rod 10 out of the depressions $e$.

The compression extension is, or should be made of sheet metal and pressed out in such shape that its flange $h$ will fit very snugly within the walls of the cap, substantially as indicated in Figs. 1 and 3.

The oil or grease is forced through this bolt oiler by filling the head 7 and the cap full of the grease and screwing the cap upon the head, the extension 9 forcing the grease into and through the openings 2—3, exactly similar to the manner that all oilers of this class force the oil upon the bearings. The rod is so set into the bolt that when the cap is screwed onto the head the end of the extension will press upon the shoulder or offset $c$ and force the rod lengthwise through the bolt with the result that the end $a$ of the rod will travel longitudinally of the slot 3, thus keeping the slot always open for the free passage of the oil or grease.

The bearing of the rod 10 against the extension 9 of the cap, at $d$, and at $f$, forms a leverage that forces the end $a$ of the rod 10 through the opening 3, and the bearing $g$ holds the rod in position to preclude the possibility of the end $a$ pressing against the surface of the bearing to be oiled to mar or scratch and injure it.

In the foregoing description I have set forth a positive means for bringing about the desired results, but it is evident that many other mechanical equivalents may be utilized to bring about the same results, hence I do not desire to restrict myself to the construction shown and described, but to cover any general plan of construction and operation that will carry out the designs hereinbefore stated as the objects of invention, for oilers of the general class herein covered.

What I claim as new, and desire to secure by Letters Patent of the United States, is:

1. In combination with a hollow bolt having a slot through one side, a screw cap upon said bolt, a compression extension member in said cap, and a rod having one end passed through the slot in the bolt, the other end actuated by the metal extension member in the cap to force the rod longitudinally in the hollow of the shaft.

2. In combination with a bolt having a hole part way through it longitudinally, and having a slot through one side of the bolt from said hole to the surface of the bolt, a cap screwed upon one end of the bolt, a compression extension member mounted inside of the cap and having depressions in its periphery, the bolt having a second slot in one side adjacent to the cap, a head upon the bolt for receiving the cap, said head having a slot adjacent to the depressions on the extension member, and a rod mounted in the bolt and engaging the several slots and depressions, as and for the purpose set forth.

3. A hollow bolt having a slot through one side and having a second slot at one end on the side of said bolt opposite from the first mentioned slot, a head on the bolt, said head having a shallow slot in its inner surface, a cap screwed upon said head, an extension member within said cap, said extension member having depressions in its peripheral surface, a rod mounted within the bolt and having one end passing through the slot in the body, and the other end engaging the several other slots and the depressions in the extension member in such a manner that the end of the rod will be held securely in the body slot and will be made to move longitudinally thereof as the cap is screwed upon the head, and the end adjacent to the cap forming a spring catch to hold the cap from accidental screwing or unscrewing on the head of the bolt.

4. In combination with a bolt having a hole drilled inwardly from the screw end thereof and extending nearly the length of the bolt, said bolt being provided with a slot from the inner end of the hole to the surface of the bolt, a wire arranged to pass into the hole with the inner end passing through the slot, and means connected with the screw end of the bolt for moving the wire longitudinally of the bolt and the slot, and for forcing grease through the slot.

Signed at Grand Rapids, Michigan, November 30, 1917.

NAPOLEON PAQUETTE.